US008289360B2

(12) United States Patent
Kim

(10) Patent No.: US 8,289,360 B2
(45) Date of Patent: Oct. 16, 2012

(54) PORTABLE TERMINAL AND METHOD FOR PROVIDING VIDEO COMMUNICATION SERVICE USING THE SAME

(75) Inventor: Jeong-Hoon Kim, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1418 days.

(21) Appl. No.: 11/785,313

(22) Filed: Apr. 17, 2007

(65) Prior Publication Data

US 2008/0030571 A1  Feb. 7, 2008

(30) Foreign Application Priority Data

Apr. 18, 2006 (KR) .................. 10-2006-0034948

(51) Int. Cl.
*H04N 7/14* (2006.01)
(52) U.S. Cl. ............... 348/14.02; 348/14.01; 379/88.13; 379/88.17; 379/88.18; 379/88.22; 709/201; 709/219; 709/232
(58) Field of Classification Search .... 348/14.01–14.16; 370/259–271, 351–356; 455/403–417, 426.1, 455/426.2, 456.1–466, 550.1–560, 575.1–575.9; 709/201–207, 217–248; 704/270–278
See application file for complete search history.

(56) References Cited

U.S. PATENT DOCUMENTS

| 5,587,735 A * | 12/1996 | Ishida et al. ............. 348/14.04 |
| 5,617,539 A * | 4/1997 | Ludwig et al. ............ 709/205 |
| 5,970,123 A * | 10/1999 | Kong ................... 379/67.1 |
| 5,991,373 A * | 11/1999 | Pattison et al. ............ 379/93.17 |
| 6,020,916 A * | 2/2000 | Gerszberg et al. ......... 348/14.07 |
| 6,034,715 A * | 3/2000 | Ishida et al. ............. 348/14.01 |
| 6,226,031 B1 * | 5/2001 | Barraclough et al. ....... 348/14.13 |
| 6,233,320 B1 * | 5/2001 | Haimi-Cohen ........... 379/88.27 |
| 6,509,924 B2 * | 1/2003 | Honguu et al. ........... 348/14.06 |
| 6,545,698 B2 * | 4/2003 | Hong ................... 348/14.02 |
| 7,404,001 B2 * | 7/2008 | Campbell et al. .......... 709/231 |
| 7,408,924 B2 * | 8/2008 | Du ..................... 370/352 |
| 7,466,334 B1 * | 12/2008 | Baba .................... 348/14.06 |
| 7,907,638 B2 * | 3/2011 | Norhammar et al. ........ 370/493 |
| 2002/0027977 A1 * | 3/2002 | Noguchi ................. 379/67.1 |
| 2002/0160751 A1 * | 10/2002 | Sun et al. ................ 455/412 |
| 2003/0041333 A1 * | 2/2003 | Allen et al. .............. 725/106 |
| 2003/0059025 A1 * | 3/2003 | Meyerson et al. ........ 379/220.01 |
| 2005/0021803 A1 * | 1/2005 | Wren, III ............... 709/231 |
| 2005/0277421 A1 * | 12/2005 | Ng ..................... 455/445 |
| 2005/0282552 A1 * | 12/2005 | Hatalkar et al. ........... 455/450 |
| 2006/0029051 A1 * | 2/2006 | Harris et al. ............. 370/356 |
| 2006/0092982 A1 * | 5/2006 | Hu ..................... 370/487 |

(Continued)

FOREIGN PATENT DOCUMENTS

JP    2005-012391    1/2005

(Continued)

*Primary Examiner* — Hemant Patel
(74) *Attorney, Agent, or Firm* — Roylance, Abrams, Berdo & Goodman, LLP

(57) ABSTRACT

A method and portable terminal for providing a video communication service are disclosed, in which video and audio data transmitted or received during video communication are recorded and the video and audio data are stored into files by the portable terminal, the files are merged; and the merged files are played. The portable terminal can store images and voices of both users during video communication by successively storing video and audio data, which are transmitted or received, in response to a user's key input and merging the video and audio data into a single file.

19 Claims, 3 Drawing Sheets

U.S. PATENT DOCUMENTS

| | | |
|---|---|---|
| 2006/0146124 A1* | 7/2006 | Pepperell et al. .......... 348/14.08 |
| 2006/0148510 A1* | 7/2006 | Zhang ........................ 455/550.1 |
| 2007/0070182 A1* | 3/2007 | Ryu et al. ................... 348/14.02 |
| 2007/0083596 A1* | 4/2007 | Ludwig et al. ................. 709/204 |
| 2007/0120964 A1* | 5/2007 | Nam et al. .................. 348/14.02 |
| 2007/0139514 A1* | 6/2007 | Marley ....................... 348/14.01 |
| 2007/0195158 A1* | 8/2007 | Kies ........................... 348/14.01 |
| 2008/0273079 A1* | 11/2008 | Campbell et al. .......... 348/14.08 |

FOREIGN PATENT DOCUMENTS

| | | |
|---|---|---|
| KR | 100226998 | 7/1999 |
| KR | 1020040093297 A | 11/2004 |
| KR | 1020060058318 A | 5/2006 |

* cited by examiner

PORTABLE TERMINAL AND METHOD FOR PROVIDING VIDEO COMMUNICATION SERVICE USING THE SAME

CROSS-REFERENCE TO RELATED PATENT APPLICATIONS

This application claims the benefit under 35 U.S.C. §119 (a) of a Korean Patent Application filed with the Korean Intellectual Property Office on Apr. 18, 2006 and assigned Serial No. 2006-34948, the entire disclosure of which is hereby incorporated by reference.

BACKGROUND OF THE INVENTION

1. Field of the Invention

The present invention relates to video communication. More particularly, the present invention relates to a portable terminal capable of storing video and audio data relating to both sides of a video communication and a method for providing a video communication service using the same.

2. Description of the Related Art

Recently, portable terminals have been evolving to transmit data at a high speed, in addition to their basic function of voice communication. Particularly, a telecommunication network based on International Mobile Telecommunications-2000 (IMT-2000) standard may be used to implement high-speed data communication, as well as voice communication, via portable terminals. Data processed by portable terminals during data communication includes packet data and video data. When equipped with a camera or a television (TV) receiver, portable terminals can also process mobile image signals. Particularly, a telecommunication terminal equipped with a camera can take pictures of desired objects and display mobile or still images of the objects. In addition, the terminal can transmit the images to another terminal.

When a portable terminal incorporates a video communication function, the portable terminal transmits and receives video data, as well as audio data. For example, the portable terminal transmits a video image of its user and receives a video image of the other side (that is, the user's partner), so that the received data can be displayed during communication.

A conventional method for providing a video communication service by using a portable terminal, which incorporates a video communication function as mentioned above, uses a data service function and inserts control data into compressed audio and video data, which are then transmitted and received via a traffic channel. However, the conventional method has a problem in that delay or jitter, which results from channel characteristics, makes it impossible to guarantee reliable quality of speech (QoS). Therefore, the transmission side of the terminal uses a predetermined protocol in order to detect loss of data, which occurs during the transmission and reception processes, and implement real-time streaming.

Such loss of audio and video data mainly occurs during transmission via wireless environments. In order to overcome this problem, a protocol, such as RTP (Real-time Transport Protocol), H.324M, H.323 or SIP, is used so that control data for error checking is transmitted together with the audio and video data. The H.324M, among the protocols, coordinates video communication standards in conformity with International Telecommunication Union—Telecommunication Standardization Sector (ITU-T). The H.324M is used to transmit compressed audio and video data from transmission-side terminals based on Wideband Code Division Multiple Access (WCDMA) scheme.

When a portable terminal incorporates a recording function in addition to a video communication function, the portable terminal can store video and audio data, which are received from the partner's terminal during video communication, or which are to be transmitted to the partner's terminal.

However, the conventional portable terminal has a limitation in that, although it can store either video and audio data to be transmitted to the partner's terminal or received from the partner's terminal, the portable terminal cannot store video and audio data from both sides of a video communication.

Accordingly, there is a need for an improved portable terminal and method for providing a video communication service in a portable terminal that stores video and audio data for both sides of a video communication.

SUMMARY OF THE INVENTION

An aspect of exemplary embodiments of the present invention is to solve the above problems and/or disadvantages and to provide at least the advantages described below. Accordingly, an aspect of exemplary embodiments of the present invention is to provide a portable terminal capable of storing images and voices from both users during video communication and a method for providing a video communication service using the same.

In accordance with an aspect of exemplary embodiments of the present invention, there is provided a method for providing a video communication service by using a portable terminal, in which video and audio data transmitted or received during video communication are recorded and the video and audio data are stored into files by the portable terminal; the files are merged; and the merged files are played.

In accordance with another aspect of exemplary embodiments of the present invention, there is provided a portable terminal for providing video communication, in which a communication transceiver unit transmits and receives video and audio data during video communication; a memory stores transmitted and received video and audio data; a control unit records the transmitted and received video and audio data, stores recorded video and audio data in the memory as files, and merges the files stored in the memory; and an output unit plays the merged files under control of the control unit.

BRIEF DESCRIPTION OF THE DRAWINGS

The above and other objects, features, and advantages of certain exemplary embodiments of the present invention will be more apparent from the following detailed description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
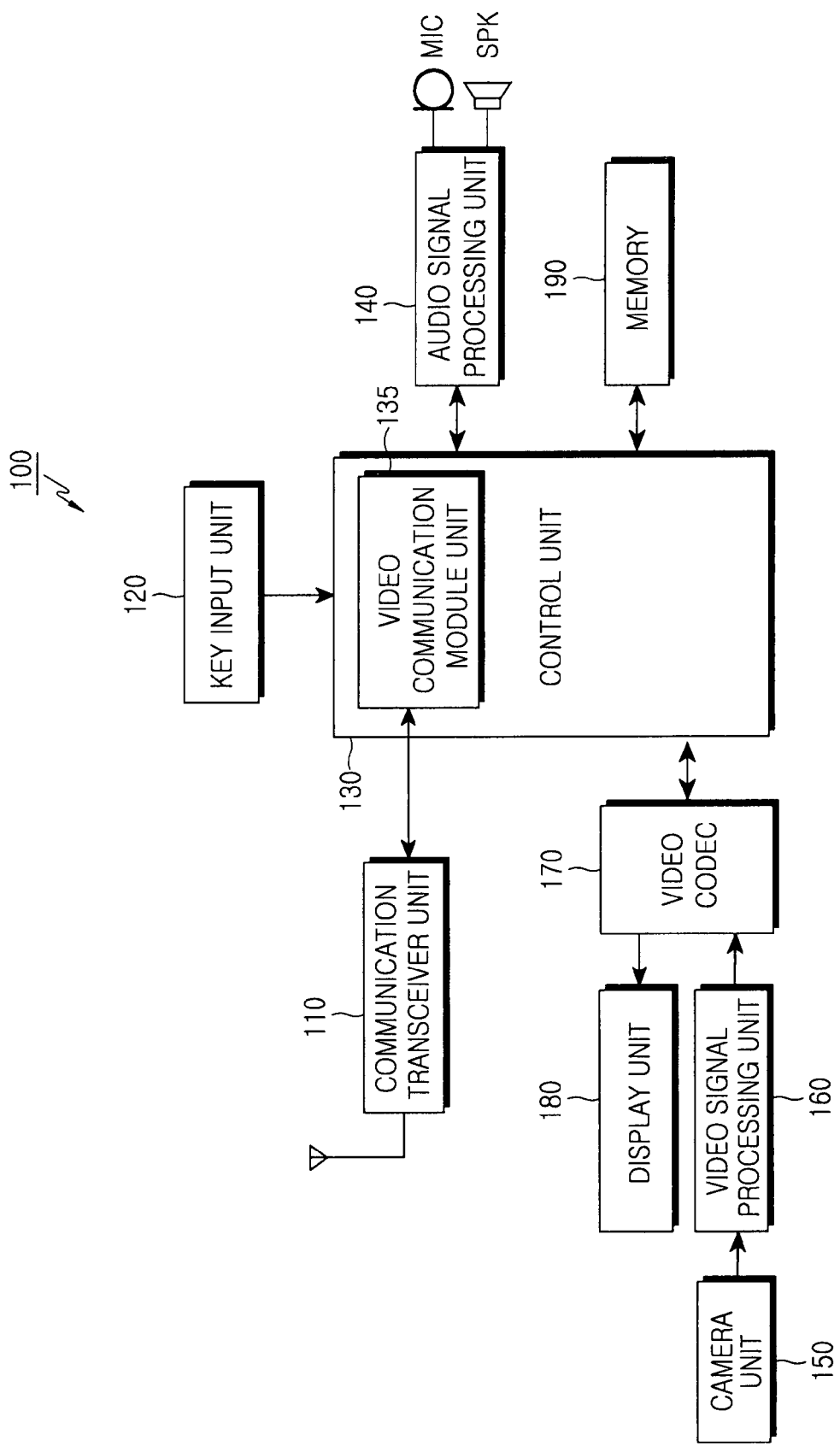
FIG. 1 is a block diagram showing the construction of a portable terminal according to an exemplary embodiment of the present invention.

FIG. 1 is a block diagram showing the construction of a portable terminal according to an exemplary embodiment of the present invention. It is assumed in the following description that the portable terminal uses a WCDMA scheme for video communication.

As shown, the portable terminal 100 includes a communication transceiver unit 110, a key input unit 120, a control unit 130, a video communication module unit 135, an audio signal processing unit 140, a camera unit 150, a video signal processing unit 160, a video codec 170, a display unit 180, and a memory 190.

The communication transceiver unit 110 transfers video communication signals (that is, video and audio data), which are received by an antenna, to the control unit 130 and transmits the video communication signals to a base station (not shown) via the antenna under the control of the control unit 130.

The key input unit 120 has a key matrix structure (not shown) including character keys, numeric keys, and various types of function keys, and outputs a key input signal to the control unit 130 in response to key input from the user. In an exemplary implementation, the key input unit 120 has a first key for recording video and audio data to be transmitted to a partner's terminal and a second key for recording video and audio data received from the partner's terminal. The first and second keys may be included in the keys of the key input unit 120 or separately provided.

The control unit 130 controls overall operation of the portable terminal 100 according to an exemplary embodiment of the present invention. The control module 130 may include a video communication module unit 135.

The control unit 130 records video and audio data, which are transmitted or received during video communication, in response to predetermined key input and stores the data in the memory 190 as a file (for example, $3^{rd}$ Generation Partnership Project (3GPP) file). For example, the control unit 130 records video and audio data, which are to be transmitted to the partner's terminal, and stores the data in the memory 190 when the first key of the key input unit 120 is operated during video communication. The video and audio data is composed of video data (from the user of the portable terminal 100) inputted via the camera unit 150 and audio data (from the same user) inputted via a microphone of the audio signal processing unit 140.

When the second key of the key input unit 120 is operated during video communication, the control unit 130 records video and audio data, which are received from the partner's terminal, and stores the data in the memory 190. The video and audio data, received in this case, relate to the user's communication partner (that is, the user of the other terminal).

The control unit 130 indexes video and audio data, which are stored as files in response to input via the first or second key during video communication, in order to recognize an order of dialogue between the users of the portable terminal 100 and the other terminal.

When the video communication is over, the control unit 130 merges files stored in the memory 190 into a single file, which is played via output units, for example, the display unit 180 and the audio signal processing unit 140, at the user's request. The video and audio data included in the merged file are played in the same order as they have been indexed.

The video communication module unit 135 demodulates and decodes video communication signals, which are received by the communication transceiver unit 110. The video communication module unit 135 separates the signals into audio and video sources and outputs the audio and video sources via the audio signal processing unit 140 and the video codec 170, respectively.

The video communication module unit 135 modulates both video and audio sources, which have been encoded by the video codec 170 and the audio signal processing unit 140, respectively, and outputs the video and audio sources to the communication transceiver unit 110.

The audio signal processing unit 140 decodes the audio source, which has been outputted by the control unit 130, into audio signals, which are then converted into analog signals and outputted externally via a speaker. The audio signal processing unit 140 digitally converts voice signals, which are inputted via the microphone, and encodes the voice signals. Then, the encoded signals are outputted as an audio source.

The audio signal processing unit 140 may constitute a codec, which may be a data codec for processing packet data or an audio codec for processing audio signals (for example, voice). The data codec and audio codec may be included in the control unit 130.

The camera unit 150 uses its lens (not shown) and converts optical signals of an object into electrical video signals, which are outputted to the video signal processing unit 160.

The video signal processing unit 160 converts the electrical video signals, which are inputted from the camera unit 150, into video signals (digital signals), which are then outputted to the video codec 170.

The video codec 170 compresses the video signals, which have been inputted from the video signal processing unit 160, and encodes the video signals into a video source, which is then outputted to the control unit 130.

The display unit 180, which may be composed of a liquid crystal display (LCD), displays various types of data created by the portable terminal 100. When a LCD of a touch screen type is used, the display unit 180 may also be used as an input unit.

The memory 190 may include a program memory and data memories. According to an exemplary embodiment of the present invention, the memory 190 stores information necessary for operation control of the portable terminal 100, as well as information selected in conformity with the user's choices. For example, the memory 190 includes a read-only memory (ROM) for storing an operating algorithm, which is accessed via the control unit 130 for overall operation of the portable terminal 100, and a random access memory (RAM) for storing data in accordance with control commands when the control unit 130 processes data.

The memory 190 stores video and audio data, which are transmitted/received by the communication transceiver unit 110, as files under the control of the control unit 130.

Figure 2:
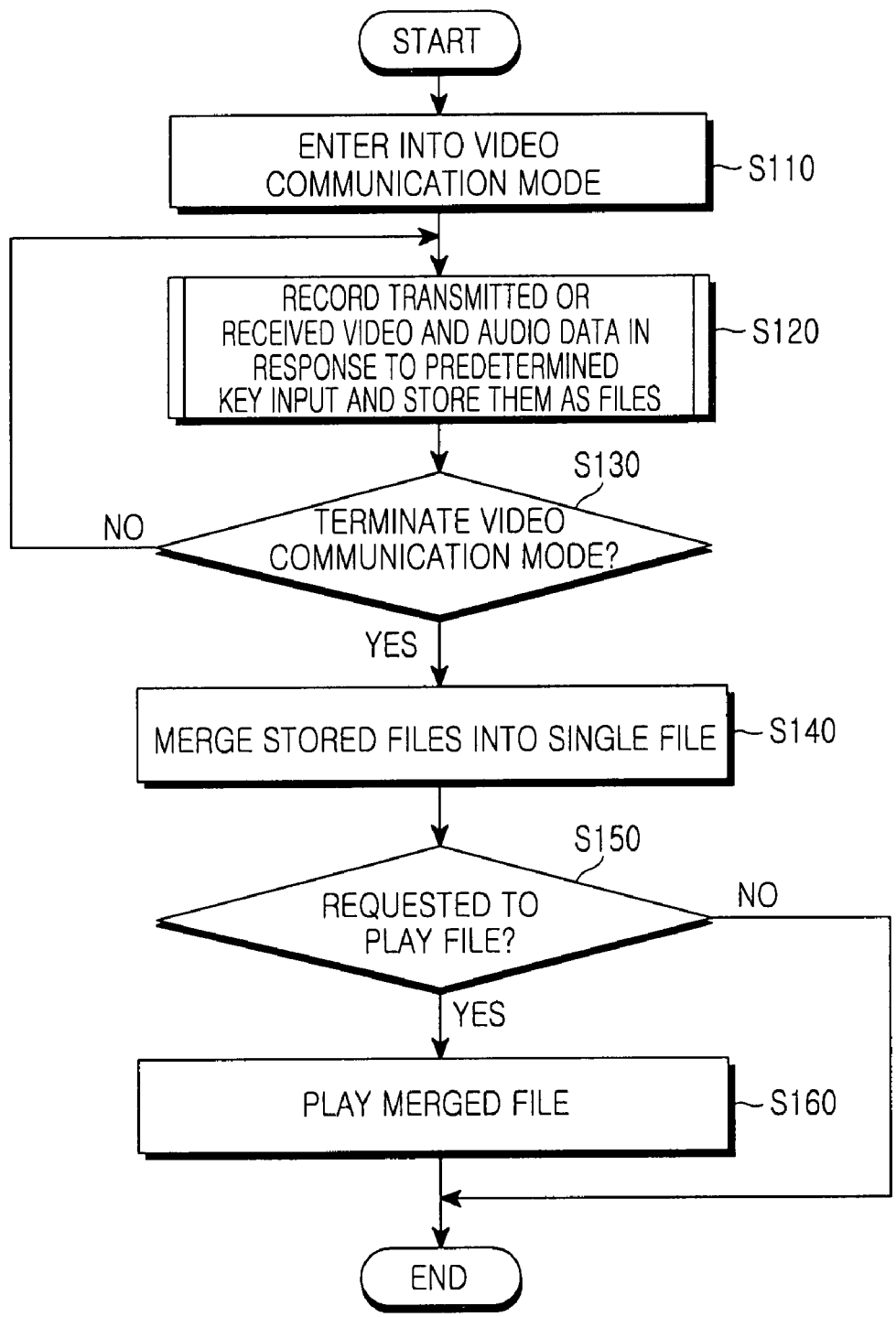
FIG. 2 is a flowchart showing a series of operation steps of a portable terminal according to an exemplary embodiment of the present invention.

FIG. 2 is a flowchart showing a series of operation steps of a portable terminal according to an exemplary embodiment of the present invention.

Referring to FIGS. 1 and 2, the control unit 130 enters into a video communication mode at the user's request (S110). For example, the control unit 130 transmits and receives video and audio data for video communication to and from the partner's terminal as requested by the user.

The control unit 130 records video and audio data, which are transmitted or received, in response to predetermined key input and stores the video and audio data as files (S120). For example, when the first key is operated, the control unit 130 stores video and audio data to be transmitted to the partner's terminal, and when the second key is operated, the control unit 130 stores video and audio data received from the partner's terminal. However, the role of the first and second keys is not limited to that described herein, and they may be switched if necessary.

The first and second keys may be included in the keys of the key input unit 120 or separately provided.

Figure 3:
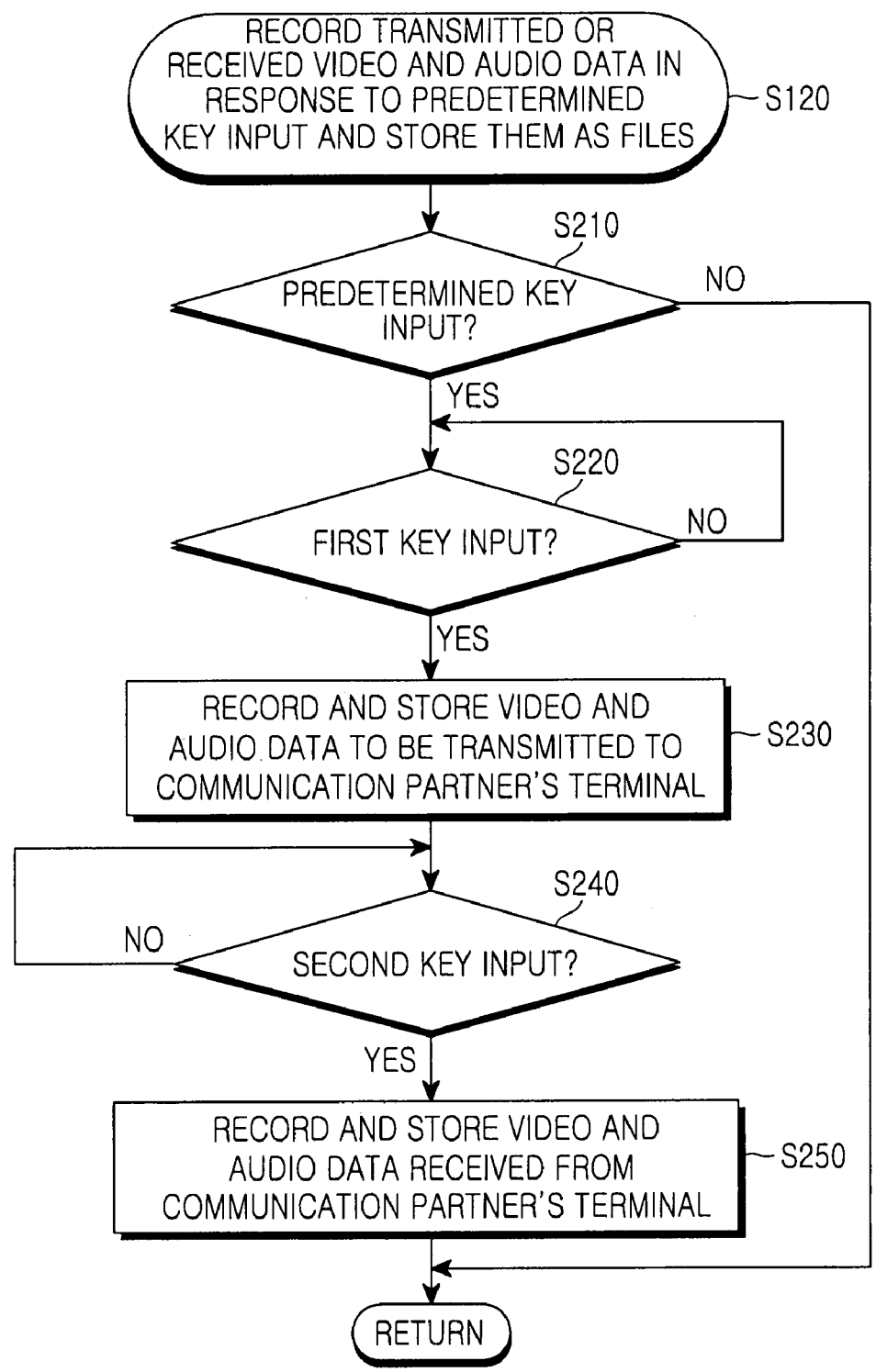
FIG. 3 is a flowchart showing in detail a step for recording and storing video and audio data, respectively, which are transmitted or received in the operation steps shown in FIG. 2.

Step S120 will now be described in more detail with reference to FIG. 3.

The control unit 130 monitors key input during video communication with the partner's terminal (S210).

When key input is detected, the control unit 130 determines if the first key has been used for that input (S220).

When the first key has been used for the input, the control unit 130 records video and audio data, which are to be transmitted to the partner's terminal, and stores the video and audio data as files in the memory 190 (S230).

More particularly, once the first key is operated, the control unit 130 records video data regarding the user, which is inputted via the camera unit 150, and audio data, which is inputted via the microphone, until another key (for example, second key) is operated. Then, recorded data is stored in the memory 190. When the first key is operated again while performing step S230, the control unit 130 preferably stops recording the video and audio data.

The control unit 130 monitors input via the second key while recording video and audio data, which are to be transmitted to the partner's terminal (S240).

When the second key is operated, the control unit 130 stops recording the video and audio data, which are to be transmitted to the partner's terminal. Then, the control unit 130 records video and audio data, which are received from the partner's terminal, and stores the video and audio data as files in the memory 190 (S250). When the second key is operated again while recording the video and audio data received from the partner's terminal, the control unit 130 preferably terminates the recording process.

When storing the transmitted or received video and audio data as files in the memory 190, the control unit 130 indexes the files every time a specific key (that is, first or second key) is operated and stores the files in the same order as they are indexed. If necessary, the control unit 130 may successively store the recorded video and audio data as a single file.

Thereafter, the control unit 130 returns to the steps of FIG. 2 and monitors a request for terminating the video communication mode (S130).

The control unit 130 repeats step S120 until there is a request for terminating the video communication mode.

Upon receiving a request for terminating the video communication mode in step S130, the control unit 130 terminates the video communication mode and merges the files stored in the memory 190 into a single file (S140).

The control unit 130 monitors the user's request for playing files (S150). When a request does not exist, the control unit 130 merges the files and terminates operation.

When a request exists for playing files, the control unit 130 plays the merged file via the display unit 180 and the audio signal processing unit 140 (S160). When there are a number of merged files, the control unit 130 provides the user with a screen for selecting a desired file.

The video and audio data, which are played by the display unit 180 and the audio signal processing unit 140 in step S160, respectively, are played in the same order as they have been recorded in the merged file.

As mentioned above, the portable terminal according to exemplary embodiments of the present invention can store images and voices from both users during video communication by successively storing video and audio data, which are transmitted or received, in response to the user's key input and merging the vide and audio data into a single file.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for providing a video communication service in a wireless terminal, the method comprising:
   recording video and audio data transmitted and received during video communication;
   storing the video and audio data as video and audio files by the wireless terminal;
   merging the video and audio files into a merged file; and
   playing the merged file.

2. The method as claimed in claim 1, wherein, in the recording of video and audio data, the video and audio data at least one of transmitted and received during video communication are recorded and stored as files in response to a key input.

3. The method as claimed in claim 2, wherein, in the recording of video and audio data, video and audio data to be transmitted to a terminal of a communication partner are recorded and stored as files in response to a first key input during the video communication.

4. The method as claimed in claim 3, wherein the first key is preset for recording video and audio data to be transmitted to the terminal of the communication partner.

5. The method as claimed in claim 3, wherein, in the recording of video and audio data, recording of the video and audio data is terminated in response to an additional first key input while the video and audio data are recorded.

6. The method as claimed in claim 2, wherein, in the recording of video and audio data, video and audio data received from a terminal of a communication partner are recorded and stored as files in response to a second key input during the video communication.

7. The method as claimed in claim 6, wherein the second key is preset for recording video and audio data received from the terminal of the communication partner.

8. The method as claimed in claim 6, wherein, in the recording of video and audio data, recording of the video and audio data is terminated in response to an additional second key input while the video and audio data are recorded.

9. The method as claimed in claim 1, wherein, in the merging of the files, the files are merged into a file when the video communication is terminated.

10. A wireless terminal for providing video communication, comprising:
    a communication transceiver unit for transmitting and receiving video and audio data during video communication;
    a memory for storing transmitted and received video and audio data;
    a control unit for recording the transmitted and received video and audio data, storing recorded video and audio data in the memory as video and audio files, and merging the video and audio files into a merged file stored in the memory; and
    an output unit for playing the merged file under control of the control unit.

11. The wireless terminal as claimed in claim 10, further comprising a key input unit for receiving input of a key operation signal from a user and outputting the key operation signal to the control unit.

12. The wireless terminal as claimed in claim 11, wherein the control unit is adapted to record the transmitted and received video and audio data and store recorded video and audio data in the memory in response to a key input of the key input unit.

13. The wireless terminal as claimed in claim 12, wherein the control unit is adapted to record video and audio data to be transmitted to a terminal of a communication partner and store recorded video and audio data in the memory in response to a first key input during the video communication.

14. The wireless terminal as claimed in claim 13, wherein the first key is preset in the key input unit to record video and audio data to be transmitted to the terminal of the communication partner.

15. The wireless terminal as claimed in claim 13, wherein the control unit is adapted to terminate recording of the video and audio data in response to additional input via the first key while the video and audio data are recorded.

16. The wireless terminal as claimed in claim 12, wherein the control unit is adapted to record video and audio data received from a terminal of a communication partner and store recorded video and audio data in the memory in response to a second key input during the video communication.

17. The wireless terminal as claimed in claim 16, wherein the second key is preset in the key input unit to record video and audio data received from the terminal of the communication partner.

18. The wireless terminal as claimed in claim 16, wherein the control unit is adapted to terminate recording of the video and audio data in response to an additional input via the second key while the video and audio data are recorded.

19. The wireless terminal as claimed in claim 10, wherein the control unit is adapted to merge the files stored in the memory into a file when the video communication is terminated.

\* \* \* \* \*